United States Patent
VanBlon et al.

(10) Patent No.: US 12,451,131 B2
(45) Date of Patent: Oct. 21, 2025

(54) PARTIAL COMPLETION OF COMMAND BY DIGITAL ASSISTANT

(71) Applicant: Lenovo (Singapore) Pte. Ltd., Singapore (SG)

(72) Inventors: Russell Speight VanBlon, Raleigh, NC (US); Robert J Kapinos, Durham, NC (US); Scott Li, Cary, NC (US); Robert James Norton, Jr., Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 637 days.

(21) Appl. No.: 17/703,813

(22) Filed: Mar. 24, 2022

(65) Prior Publication Data

US 2023/0306966 A1    Sep. 28, 2023

(51) Int. Cl.
*G10L 15/22* (2006.01)
*G06F 3/16* (2006.01)
*G10L 15/30* (2013.01)

(52) U.S. Cl.
CPC .............. *G10L 15/22* (2013.01); *G06F 3/167* (2013.01); *G10L 2015/221* (2013.01); *G10L 2015/223* (2013.01)

(58) Field of Classification Search
None
See application file for complete search history.

(56) References Cited

U.S. PATENT DOCUMENTS

| 2013/0132089 A1* | 5/2013 | Fanty | G10L 15/30 704/270 |
| 2015/0199965 A1* | 7/2015 | Leak | G10L 15/22 704/249 |
| 2016/0161946 A1* | 6/2016 | Wuth Sepulveda | G05D 1/0022 701/2 |
| 2017/0011735 A1* | 1/2017 | Kim | G10L 15/005 |
| 2019/0214024 A1* | 7/2019 | Gruber | G06F 16/2457 |
| 2019/0279620 A1* | 9/2019 | Talwar | G10L 15/22 |
| 2022/0180866 A1* | 6/2022 | Sharifi | G10L 25/78 |
| 2023/0154464 A1* | 5/2023 | Han | G10L 15/22 704/270 |
| 2023/0306966 A1* | 9/2023 | VanBlon | G06F 3/167 |
| 2023/0419807 A1* | 12/2023 | Pourmohammad | G08B 23/00 |

* cited by examiner

*Primary Examiner* — Seong-Ah A Shin
(74) *Attorney, Agent, or Firm* — FERENCE & ASSOCIATES LLC

(57) ABSTRACT

One embodiment provides a method, the method including: receiving, at a digital assistant, a command from a user, wherein the command includes a high confidence portion and a low confidence portion; determining, at the digital assistant, that at least a part of the output corresponding to the command can be performed by the digital assistant based upon the high confidence portion; and performing, using the digital assistant and responsive to determining the at least a part of the output of the command can be performed by the digital assistant, the at least a part of the output of the command.

16 Claims, 3 Drawing Sheets

PARTIAL COMPLETION OF COMMAND BY DIGITAL ASSISTANT

BACKGROUND

Many users utilize digital personal assistants (DPAs), also referred to as digital assistants, assistants, and the like. The digital personal assistants may be included in user devices (e.g., smart phones, smart watches, tablets, laptops, personal computers, etc.), as stand-alone devices (e.g., smart speakers, digital assistant hubs, etc.), smart appliances or televisions (e.g., refrigerators, stoves, etc.), and/or the like. Thus, the use of digital assistants has significantly increased as the devices having digital assistants have increased. Due to the increase in digital assistants and devices having digital assistant technology, many attempts to make the digital assistants easier to use and more human-like have occurred, thereby making it easier for all users to utilize and interface with.

BRIEF SUMMARY

In summary, one aspect provides a method, the method including: receiving, at a digital assistant, a command from a user, wherein the command includes a high confidence portion and a low confidence portion; determining, at the digital assistant, that at least a part of the output corresponding to the command can be performed by the digital assistant based upon the high confidence portion; and performing, using the digital assistant and responsive to determining the at least a part of the output of the command can be performed by the digital assistant, the at least a part of the output of the command.

Another aspect provides an information handling device, the information handling device including: a processor; a memory device that stores instructions that, when executed by the processor, causes the information handling device to: receive, at a digital assistant, a command from a user, wherein the command includes a high confidence portion and a low confidence portion; determine, at the digital assistant, that at least a part of the output corresponding to the command can be performed by the digital assistant based upon the high confidence portion; and perform, using the digital assistant and responsive to determining the at least a part of the output of the command can be performed by the digital assistant, the at least a part of the output of the command.

A further aspect provides a product, the product including: a computer-readable storage device that stores executable code that, when executed by a processor, causes the product to: receive, at a digital assistant, a command from a user, wherein the command includes a high confidence portion and a low confidence portion; determine, at the digital assistant, that at least a part of the output corresponding to the command can be performed by the digital assistant based upon the high confidence portion; and perform, using the digital assistant and responsive to determining the at least a part of the output of the command can be performed by the digital assistant, the at least a part of the output of the command.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
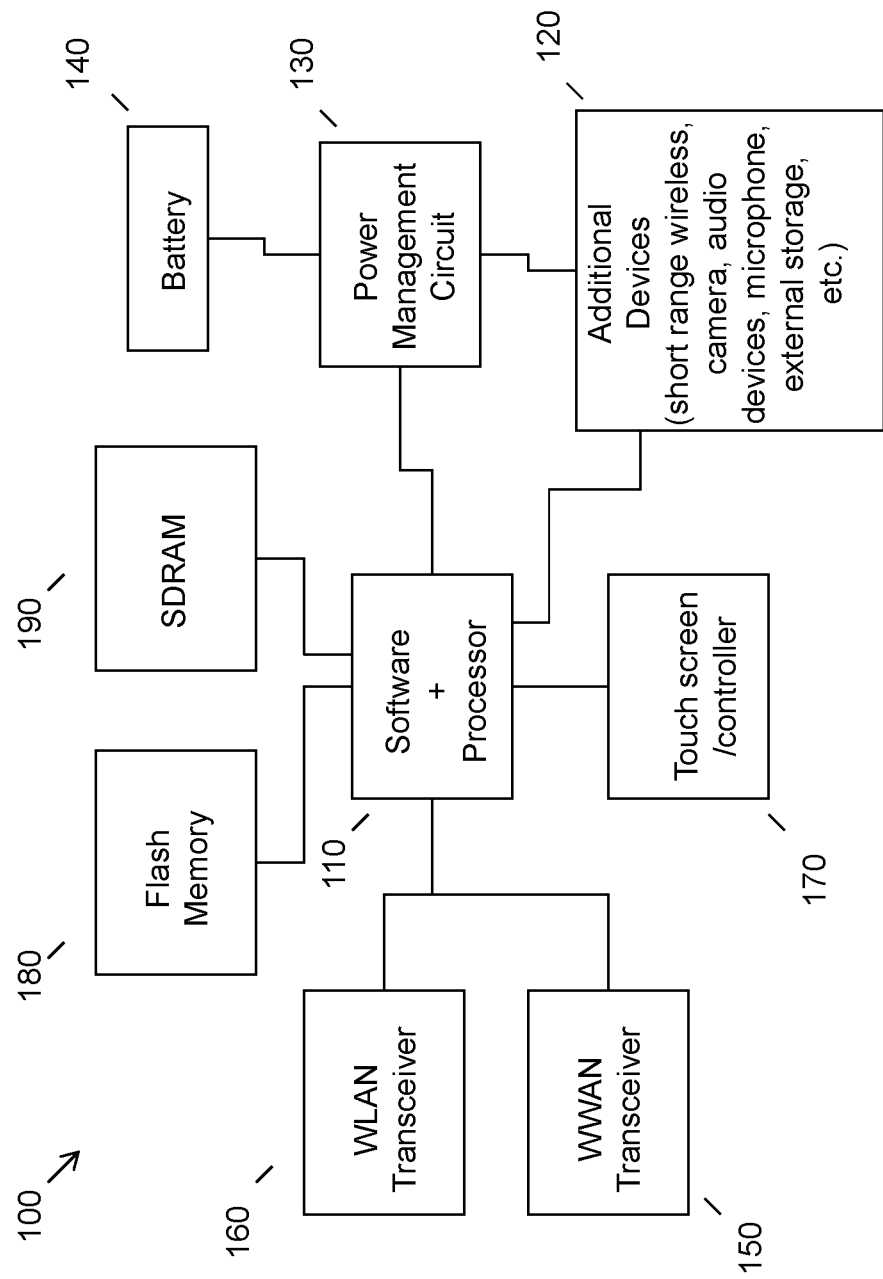
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Many attempts to make digital assistants easier to use and more intuitive have occurred and continue to occur. For example, digital assistants have been programmed to respond to different wake words selected by the user, provide for multi-turn conversations without requiring a wake word between inputs, match user dialects or speech patterns, increase output speed, and/or the like. However, one area that has not been improved is when the digital assistant acts on a command. Generally, an entire command has to be received at the digital assistant before it will start processing the command and performing an action, including providing an output, corresponding to the command. In addition, the digital assistant has to fully understand the command before it will start processing the command. Thus, if the digital assistant misses part of the command, misunderstands part of the command, part of the command is unclear, and/or the like, the digital assistant must clarify the command before providing an action on the command.

While there are many situations where it is best that the digital assistant correctly understands the whole command that a user is attempting to provide to the digital assistant, there are also many situations where the digital assistant could start performing the command and then request clarification from the user regarding the missing or unclear portion of the command. However, digital assistants are not currently programmed to start performance of a command until the entire command is received and understood by the digital assistant. This causes frustration to the user, particularly if the user is in a rush and needs the digital assistant to quickly perform an action.

Accordingly, the described system and method provides a technique for starting performance of an action by a digital personal assistant based upon partial high confidence command input and determining that the action can be started using the partial high confidence command input. The digital assistant receives a command from a user and identifies that the command includes a high confidence portion and a low confidence portion. The high confidence portion correlates to a portion of the command input that the digital assistant understands, whereas the low confidence portion correlates to a portion of the command input that the digital assistant does not understand. For example, the digital assistant may misunderstand the low confidence portion, may have missed the low confidence portion, finds the low confidence portion unclear, and/or the like.

The digital assistant analyzes the high confidence portion to determine if at least a part of the output corresponding to the command can be performed by the digital assistant. In other words, the digital assistant determines if the high confidence portion corresponds to an action that can be performed by the digital assistant, even though it is just part of the full action to be performed by the digital assistant. If the high confidence portion corresponds to at least part of the output, the digital assistant performs the identified part of the output. Depending on the command and corresponding action, the digital assistant may then ask for clarification of the low confidence portion of the command or perform alternative options for the low confidence portion of the command.

Therefore, a system provides a technical improvement over traditional methods for performing actions using digital personal assistants. Conventional digital assistant systems will not start processing a command input and providing an output until the digital assistant fully understand that command. However, since the described system identifies a high confidence portion of the command and a corresponding part of an action that can be performed by the digital assistant, even if the command includes a low confidence portion, the described system can more quickly start performing the action and then get clarification from the user regarding the low confidence portion. Thus, the described system and method provides a technique that increases the usability of the digital assistant, reduces frustration of the user, and shortens the time it takes for a digital assistant to provide output to a user as compared to conventional techniques that require the user to fill in any missing information before the digital assistant starts processing the command and provides any output.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, input/output (I/O) ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use serial advanced technology attachment (SATA) or peripheral component interconnect (PCI) or low pin count (LPC). Common interfaces, for example, include secure digital input/output (SDIO) and inter-integrated circuit (I2C).

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply basic input/output system (BIOS) like functionality and dynamic random-access memory (DRAM) memory.

System 100 typically includes one or more of a wireless wide area network (WWAN) transceiver 150 and a wireless local area network (WLAN) transceiver 160 for connecting to various networks, such as telecommunications networks and wireless Internet devices, e.g., access points. Additionally, devices 120 are commonly included, e.g., a wireless communication device, external storage, etc. System 100 often includes a touch screen 170 for data input and display/rendering. System 100 also typically includes various memory devices, for example flash memory 180 and synchronous dynamic random-access memory (SDRAM) 190.

Figure 2:
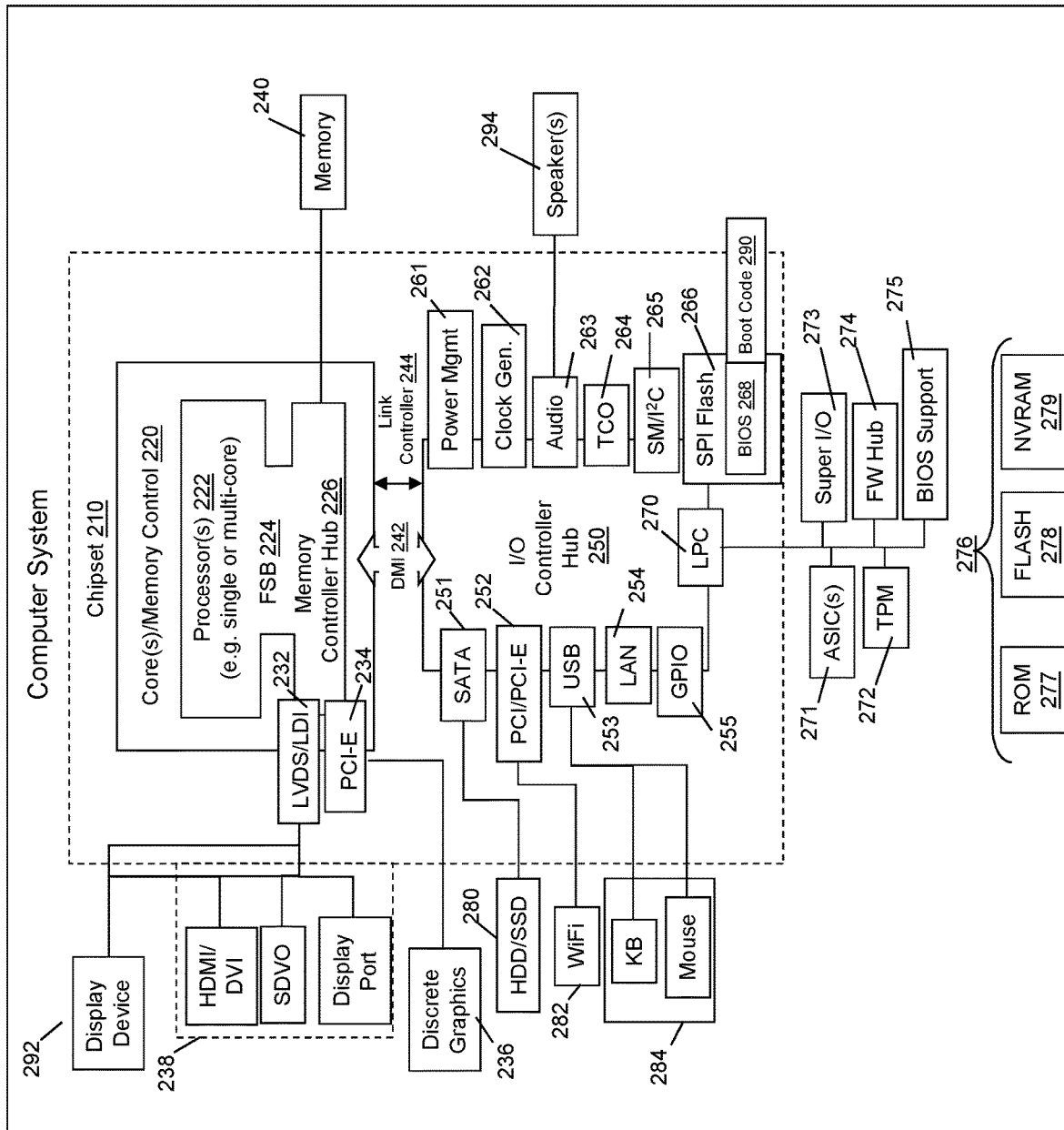
FIG. 2 illustrates another example of information handling device circuitry.

FIG. 2 depicts a block diagram of another example of information handling device circuits, circuitry or components. The example depicted in FIG. 2 may correspond to computing systems such as personal computers, or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of random-access memory (RAM) that may be referred to as "system memory" or "memory"). The memory controller hub 226 further includes a low voltage differential signaling (LVDS) interface 232 for a display device 292 (for example, a cathode-ray tube (CRT), a flat panel, touch screen, etc.). A block 238 includes some technologies that may be supported via the low-voltage differential signaling (LVDS) interface 232 (for example, serial digital video, high-definition multimedia interface/digital visual interface (HDMI/DVI), display port). The memory controller hub 226 also includes a PCI-express interface (PCI-E) 234 that may support discrete graphics 236.

In FIG. 2, the I/O hub controller 250 includes a SATA interface 251 (for example, for hard-disc drives (HDDs), solid-state drives (SSDs), etc., 280), a PCI-E interface 252 (for example, for wireless connections 282), a universal serial bus (USB) interface 253 (for example, for devices 284 such as a digitizer, keyboard, mice, cameras, phones, microphones, storage, other connected devices, etc.), a network interface 254 (for example, local area network (LAN)), a general purpose I/O (GPIO) interface 255, a LPC interface 270 (for application-specific integrated circuit (ASICs) 271, a trusted platform module (TPM) 272, a super I/O 273, a firmware hub 274, BIOS support 275 as well as various types of memory 276 such as read-only memory (ROM) 277, Flash 278, and non-volatile RAM (NVRAM) 279), a power management interface 261, a clock generator interface 262, an audio interface 263 (for example, for speakers 294), a time controlled operations (TCO) interface 264, a system management bus interface 265, and serial peripheral interface (SPI) Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices, which may be used in systems include digital personal assistants that respond to commands provided by a user. For example, the circuitry outlined in FIG. 1 may be implemented in a tablet or smart phone embodiment, whereas the circuitry outlined in FIG. 2 may be implemented in a personal computer embodiment.

Figure 3:
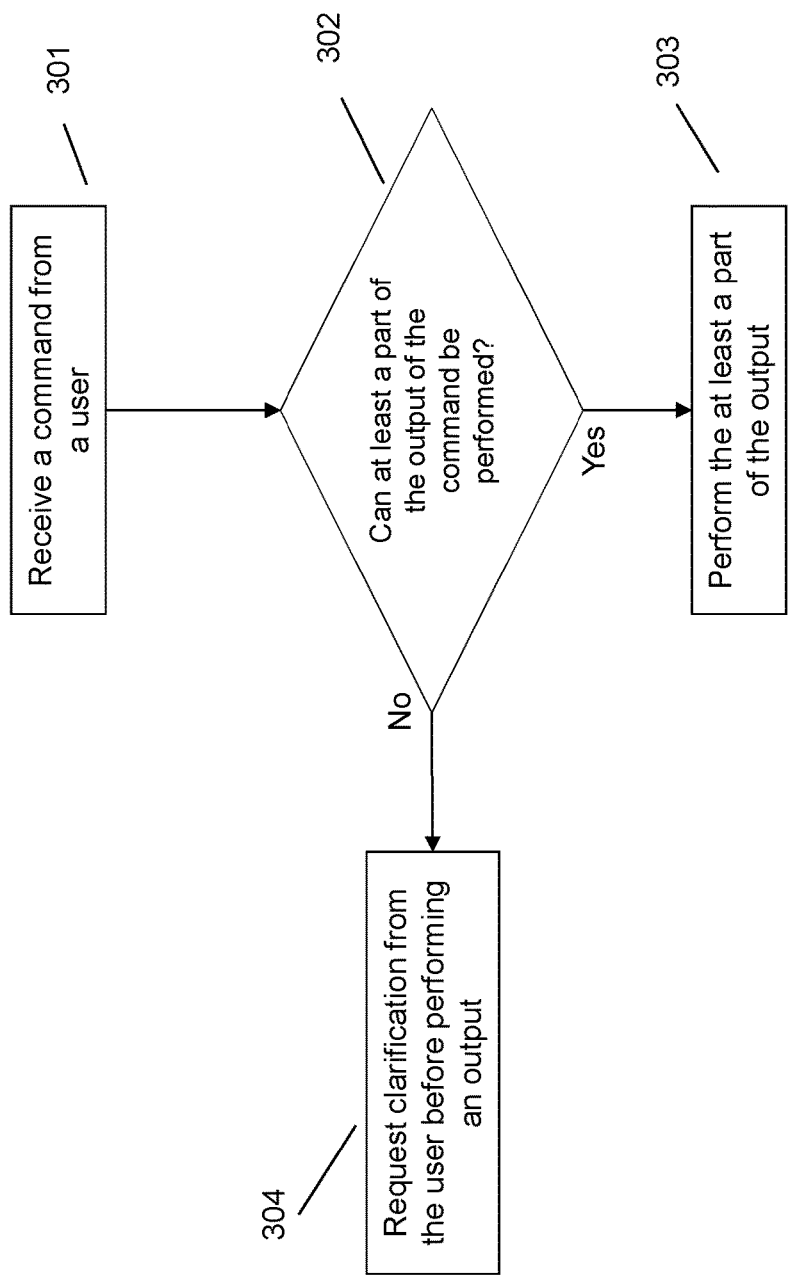
FIG. 3 illustrates an example method for starting performance of an action by a digital personal assistant based upon partial high confidence command input and determining that the action can be started using the partial high confidence command input.

FIG. 3 illustrates an example method for starting performance of an action by a digital personal assistant based upon partial high confidence command input and determining that the action can be started using the partial high confidence command input. The method may be implemented on a system which includes a processor, memory device, output devices (e.g., display device, printer, etc.), input devices (e.g., keyboard, touch screen, mouse, microphones, sensors, biometric scanners, etc.), image capture devices, and/or other components, for example, those discussed in connection with FIG. 1 and/or FIG. 2. While the system may include known hardware and software components and/or hardware and software components developed in the future, the system itself is specifically programmed to perform the functions as described herein to start actions at a digital personal assistant using partial high confidence command input. Additionally, the system includes modules and features that are unique to the described system.

The described system and method can be implemented on a system that includes a digital personal assistant. The digital personal assistant, also referred to as a digital assistant or simply an assistant, may be a part of a system or device or a stand-alone dedicated device. For example, the digital personal assistant may be a part of a smart phone, tablet, smart watch, personal computer, laptop, smart appliance (e.g., refrigerator, stove, etc.), smart television or remote, navigation system, and/or the like, or may be a smart speaker, digital assistant hub, and/or the like. In either case, the device including the digital assistant or the stand-alone dedicated device may be a part of a larger system, for example, a digital assistant network system having a plurality of assistant devices, a network, a network of interconnected devices like an Internet of Things (IoT) setting, a cloud network system, and/or the like. Either the digital personal assistant itself or a system including the digital personal assistant can perform the processing and analysis to determine that at least a portion of an output can be performed by the digital assistant based upon part of the command input having a high confidence portion. The digital assistant can then at least start the action based upon the high confidence portion.

Before receiving a command from the user, for example, at 301, the digital personal assistant may first be in a conversational session with the user. A conversational session is a session with the user where the user can provide input to the digital personal assistant and the digital personal assistant can provide output. The output may be in the form of a response to an input received from the user, the form of performing an action in response to an input received from the user, the form of providing instructions to another system or device to perform an action or provide a response, and/or the like. In order to start the conversational session, the digital personal assistant, also referred to as a digital assistant, is changed to an active state through an activation input. The activation input may include a wake-up word or phrase, a wake-up gesture, a wake-up movement, and/or any other wake-up or activation input. Before receiving the command from the user at 301, the user and digital assistant may have exchanged input and outputs in different turns. Alternatively, the command received at 301 may be the first input provided by the user to the digital assistant after the digital assistant has been activated and the conversational session has been initiated.

At 301, the digital assistant, or system including a digital assistant, receives a command from a user. In other words, the digital assistant receives an input from a user for the digital assistant to provide an output, which may include performing an action, providing a response to the command, providing instructions to another device or system to perform an action or provide a response, and/or the like. For ease of readability, the system will be described as if the digital assistant itself is performing the described steps. However, as discussed further herein, the digital assistant may be part of a larger system and it may be the system of the digital assistant that performs one or more of the steps. Nonetheless, the terminology "digital assistant" or some variation thereof will be used here throughout to refer to this performance entity. However, this is not intended to be limiting as either the digital assistant itself or a larger system including the digital assistant can perform the steps described herein.

The command may include a high confidence portion and a low confidence portion as determined by the digital assistant. In other words, the digital assistant attempts to process the received command and identifies a confidence of the digital assistant with respect to portions of the command. When the digital assistant is processing the received command, the digital assistant may assign confidence values to each portion of the command. The confidence values identify how confident the digital assistant is with respect to each portion. In other words, the confidence values identify how confident the digital assistant is that the digital assistant understands the portion of the command.

Higher confidence values indicate that the digital assistant is more confident of the content of the command than lower confidence values. Portions having a confidence value meeting or exceeding a predetermined threshold may be considered high confidence portions and portions having a confidence value less than the predetermined threshold may be considered low portions. Low confidence values may be associated with a portion of the command that was missed by the digital assistant, misunderstood by the digital assistant, was unclear at the digital assistant, and/or the like. For example, the low confidence portion may correspond to a portion of the command that is missing, unclear, misunderstood, and/or the like, and needed for complete performance of an action of the command by the digital assistant. Identifying high and low confidence portions of the command may be performed as the command is received or shortly thereafter, thereby providing the confidence identification in substantially real-time as the command is received.

At 302, the digital assistant determines if at least a part of the output corresponding to the command can be performed based upon the high confidence portion of the command. In other words, the digital assistant determines if the high confidence portion either corresponds to a stand-alone command having a corresponding output or if the high confidence portion identifies enough of the command that some portion of the output corresponding to the command can be performed. As an example, the command may include two different commands, each having a corresponding output to be provided by the digital assistant. If the digital assistant correctly captured one of the portions, the digital assistant may act on that portion of the command. As another example, if the command has a common starting action and that starting action can be identified from the high confidence portion, the digital assistant may identify that enough of the command was understood to perform at least a part of the action corresponding to the command, specifically, the common starting action.

Thus, the high confidence portion may correspond to a common part of an action across a plurality of actions related to the command. A common part of an action refers to an action or sub-action that must be performed regardless of the action that is intended with the full command, also referred to as the end action. A common part of an action may correspond to one or more starting actions of the end action and that apply to many or all possible end actions. As an example, if the end action is to perform a specific action at a device, a common part may be to turn on the device. As another example, if the end action is to navigate to a particular location, the common part may be starting the navigation from a starting point.

Thus, even though the end action is not known or unclear, the common part of the action could be performed. It should be noted that the high confidence portion may not be explicitly included in the command. For example, if the command is to tune the radio to a specific media input, the common part of the action may be to turn on the radio. However, as understood by this example, the command did not explicitly include that the radio needs to be turned on. As another example, if the command is to order a product from a retailer, the common part of the action may be to access the web site of the retailer. However, the command does not explicitly state that the website of the retailer needs to be accessed. Thus, the high confidence portion may be an implied portion of the command.

Determining whether the at least a part of the action corresponding to the command can be performed may also be based upon user settings. As can be understood, one purpose of the described system is to reduce the amount of time it takes for the digital assistant to perform an action or at least start an action. However, a user can identify whether this desire for efficiency over a complete command is desired. For example, the user can make a selection or change a setting to identify whether efficiency or strict completion is desired. The determining at 302 and the performance of an action may be adjusted based upon this selection. If a strict completion is desired, then the system may not make a determination of whether part of a command could be performed at 302.

The efficiency versus strict completion selection may vary between actions, devices, systems, users, and/or any other factor. For example, a user may want GPS navigation to occur as efficiently as possible, which would trigger the system to determine if the high confidence portion identifies a part of a command that can be completed. However, the same user may want television commands to be strict completion commands, which would cause the digital assistant to determine that at least a part of the action corresponding to the command cannot be performed at 302. As another example, one user may desire efficiency for ordering commands, whereas another user of the same device, system, and digital assistant may desire strict completion for ordering commands.

Additionally, or alternatively, the efficiency versus strict command designation may be based upon an attribute of the user, device, and/or the like. The digital assistant may identify there is some attribute of the user or device that indicates which of the efficiency or strict command should be selected. If an attribute identifies a necessity or desirability for one of efficiency or strict command over the other, then that attribute will determine which mode the digital assistant will operate within. This attribute may also be used to override user, device, system, action, and/or the like, preferences as previously discussed. Thus, the digital assistant can automatically select whether efficiency or strict command will be applied to an incoming command.

As an example of automatically selecting a mode (e.g., efficient versus strict command or a combination thereof), if the digital assistant determines that a signal will be lost if the user starts moving based upon a signal strength attribute of the device, the digital assistant may determine that a strict command mode should be engaged so that the signal is not lost when the device is requesting clarification. As another example, if the digital assistant determines that an attribute of the user indicates that the user is rushed for time, the digital assistant may determine that an efficiency mode should be engaged. For example, the user may be providing a command for navigation. The digital assistant may identify from a secondary source (e.g., calendar, communication correspondence, alarm, alert, or notification, etc.), a sentiment or attitude of the user, a current time, and/or the like, that the user is likely going to rushed. For example, the digital assistant may identify that the user has an appointment in half an hour and that the high confidence portion of the command indicates a destination that will take half an hour. Thus, the digital assistant may automatically select the efficiency mode in this example.

If the digital assistant determines that at least part of the action cannot be performed at 302, the system may take no action or work as conventional systems do at 304. Specifically, the digital assistant may request clarification from the user in order to make a complete command before performing an output at 304. Determining that at least part of an action cannot be performed may result from the use of a strict command mode, an inability to identify a common part of an action, user, device, and/or other factor preferences, and/or the like.

If, on the other hand, the digital assistant determines that at least a part of the output of the command can be performed at 302, the system may perform the at least a part of the output at 303. In other words, responsive to determining that at least a part of the action can be performed using the high confidence portion, the digital assistant may perform the at least a part of the action. For example, if the digital assistant has determined that the high confidence portion of the command corresponds to a common action, the digital assistant may perform the common action. As or immediately after performing an action based upon the high confidence portion, the digital assistant may request input from the user clarifying the low confidence portion. In other words, the digital assistant may request clarifying input from the user in order to identify the end action of the command.

Once the clarifying input is received, the digital assistant may update the performance of the partial action to the end action based upon the high confidence portion and the clarified low confidence portion. In other words, the digital assistant uses the clarifying input to update the partial action that is being performed or that was just performed into the end action that was desired by the user from the original command received at 301. The end action is then performed by the digital assistant.

Additionally, or alternatively, the digital assistant may also be able to perform the entire action based solely on the high confidence portion. In this case, the digital assistant may be able to identify a single or plurality of options that can be used to complete or fill in the low confidence portion of the command. In other words, based upon the high confidence portion, the digital assistant may identify one, a few, or a small number of alternative options that could be used for the low confidence portion and make a command that will make sense. The single or alternative options may be identified using a type of autofill technique. The single or alternative options may also be identified using historical data of a user providing the command, the device receiving the command, and/or the like. Based upon historical data, the digital assistant can identify common commands provided by the user. Using the high confidence portion, the digital assistant can determine if the high confidence portion corresponds to any of the historical commands, thereby allowing the digital assistant the ability to identify one or more alternate commands that could be intended by the user.

The single or alternative options for the low confidence portion, may also be identified using a machine-learning model, crowd-sourced data, a learning algorithm, and/or the like. If using a machine-learning model, the model may be trained used historical information that identifies correlations between high confidence command portions and end actions corresponding to the full command. In other words, the training data for the machine-learning model is based upon correlations between high confidence portions and end actions that are ultimately performed once the entire command is received and identified. The trained model can then be used to make predictions regarding the end action with the high confidence portion as an input. Feedback can be automatically ingested by the model to further refine the model. A combination of option identification techniques may also be used.

In the event that the digital assistant identifies alternative options, the digital assistant may still perform the action and not request clarifying input from the user. The digital assistant may determine that the time necessary for requesting, receiving, and processing the clarifying input is longer than an amount of time to perform actions corresponding to all the alternatives. For example, if the user is requesting a response to a question and the alternative actions that could be used for the low confidence portion would result in a response that is quicker and that answers the question than requesting clarifying input, the digital assistant may just provide the response to the question for all alternative actions.

In addition to using a time length to determine whether to perform alternative actions or request clarifying input, the digital assistant may determine if the alternative actions are conflicting actions that cannot all be performed. If the alternative actions are conflicting actions, even though performing all of the actions would take less time than requesting clarifying input, the digital assistant may request clarifying input. For example, if the user command is to turn on the oven to a particular temperature and the digital assistant is unclear about the specific temperature, the digital assistant may determine that all possible alternative temperatures are conflicting alternatives because one temperature would override another temperature. Thus, even though cycling through all the temperatures may be quicker than requesting, receiving, and processing clarifying input, the digital assistant would request clarifying input.

Another factor that can be utilized to determine whether to perform alternative actions or request clarifying input is based upon a logic of the end result of performing all alternative actions. If the end result would be illogical or cause the user to ultimately spend more time to get the desired action performed, the digital assistant may instead request clarifying input. For example, if the action is to turn on a particular light, but the digital assistant is unable to determine which light the user specified, the digital assistant may determine that it would be quicker to turn on all the lights. However, it is not logical that the user would want all the lights turned on and would require the user to then either manually turn off the lights or provide input to turn off specific lights, thereby causing the user to spend more time to get the desired result. Therefore, in this example, the digital assistant will request clarifying input before performing all alternative actions based upon a logic of the end result of performing all alternative actions.

One example use case that illustrates the overall system is a global positioning system (GPS) navigation system. The user provides a command to start route guidance to a specific location. However, the digital assistant of the GPS navigation system determines that the specific destination location corresponds to a low confidence portion of the command. On the other hand, the digital assistant determines that the user did want to start route guidance and that part of the command corresponds to a high confidence portion. The digital assistant also determines that the first few steps or directions of the route will be the same, regardless of the specific destination location. Thus, the digital assistant identifies that starting the route guidance and the first few steps or directions of the route are common actions regardless of the destination location. Accordingly, the digital assistant can start route guidance using the first few steps or directions of the route and request user clarification regarding the destination location. Upon receiving the clarifying input, the digital assistant can update the route guidance based upon the specific location.

Another example use case includes the use of a digital assistant of a smart television or smart remote of a television. The user provides a command to turn the television to a specific channel. The digital assistant determines that the specific channel corresponds to a low confidence portion. However, the digital assistant also identifies that fact that the user wants to turn the television to a channel corresponds to a high confidence portion. The digital assistant also identifies that the television is not currently powered on. Thus, the digital assistant determines that in order to fulfill any part of the command that requires navigation to a channel, regardless of the channel, requires that the television be first turned on. Thus, turning the television on is considered a common action and one that can be performed by the digital assistant while the user is providing clarification input. When the clarification input is received the digital assistant can update the action to include the specific channel, or create a new action that navigates to the specific channel. A similar series of events could occur in other use cases, for example, an oven being turned to a specific temperature where the oven being turned on is a common action.

Another example use case includes the use of a digital assistant in providing a response to a question provided by the user. In this example use case, the user asks the digital assistant "What time is it in the United Kingdom?" However, the digital assistant identifies that the term "Kingdom" corresponds to a low confidence portion, for example, because the digital assistant found that part of the command unclear. The remaining part of the question corresponds to the high confidence portion. However, in order to correctly provide output in this case, the digital assistant would need to know that "Kingdom" was the missing portion. On the other hand, the digital assistant determines that the three main options that would occur with "time" and after "United" are "States," "Kingdom," and "Arab Emirates." Since the time associated with determining and outputting a response to each of these three options is less than the time it would take to request, receive, and process clarifying input, the digital assistant instead provides a response to each of the three options instead of requesting clarifying input.

It should be understood that these are merely example use cases in order to more fully and clearly explain the described system. However, these are not intended to be limiting examples in any way and the described system and method can be applied to many other use cases.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Additionally, the term "non-transitory" includes all media except signal media.

Program code embodied on a storage medium may be transmitted using any appropriate medium, including but not limited to wireless, wireline, optical fiber cable, radio frequency, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, the method comprising:

receiving, at a digital assistant on an information handling device, a command from a user, wherein the command comprises a high confidence portion and a low confidence portion;

determining, at the digital assistant and utilizing a machine-learning model, that at least a part of an output corresponding to the command can be performed by the digital assistant based upon the high confidence portion, wherein the determining comprises identifying an electronic efficiency of starting an action present within the at least a part of the output corresponding to the command is designated between one of: an efficiency mode of operation and a strict command mode of operation, wherein the identifying the electronic efficiency of starting the action is designated based upon an attribute of at least one of: the user and the device, wherein identifying the attribute comprises utilizing historical data identifying correlations between the high confidence portion of the command and an end action corresponding to the command; and performing, using the digital assistant and responsive to determining the at least a part of the output of the command can be performed by the digital assistant, the at least a part of the output of the command associated with the high confidence portion, wherein the performing comprises performing the action based upon the electronic efficiency of the starting of the action of the command and the historical data used to identify the correlations between the high confidence portion of the command the end action corresponding to the command.

2. The method of claim 1, comprising requesting input from the user clarifying the low confidence portion and updating, responsive to receiving the input, the performing to perform the action of the command based upon the high confidence portion and the clarified low confidence portion.

3. The method of claim 1, comprising identifying alternative actions corresponding to the low confidence portion and wherein the performing comprises performing the alternative actions.

4. The method of claim 3, wherein the performing the alternative actions is responsive to determining the performing alternative actions is quicker than requesting and receiving input from a user regarding the low confidence portion.

5. The method of claim 1, comprising identifying, using historical information of the user, a possible input for the low confidence portion, and wherein the performing is based upon the possible input.

6. The method of claim 1, wherein the high confidence portion corresponds to a common part of an action across a plurality of actions related to the command.

7. The method of claim 1, wherein the low confidence portion comprises a portion of the command that was not understood by the digital assistant.

8. The method of claim 1, wherein the low confidence portion comprises a missing portion of the command needed for complete performance of an action of the command by the digital assistant.

9. An information handling device, the information handling device comprising:

a processor;

a memory device that stores instructions that, when executed by the processor, causes the information handling device to:

receive, at a digital assistant, a command from a user, wherein the command comprises a high confidence portion and a low confidence portion;

determine, at the digital assistant and utilizing a machine-learning model, that at least a part of an output corresponding to the command can be performed by the digital assistant based upon the high confidence portion, wherein to determine comprises identification of an electronic efficiency of starting an action present within the at least a part of the output corresponding to the command is designated between one of: an efficiency mode of operation and a strict command mode of operation, wherein the identification of the electronic efficiency of starting the action is designated based upon an attribute of at least one of: the user and the device, wherein identification of the attribute comprises utilizing historical data identifying correlations between the high confidence portion of the command and an end action corresponding to the command; and perform, using the digital assistant and responsive to determining the at least a part of the output of the command can be performed by the digital assistant, the at least a part of the output of the command associated with the high confidence portion, wherein to perform comprises performance of the action based upon the electronic efficiency of the starting of the action of the command and the historical data used to identify the correlations between the high confidence portion of the command the end action corresponding to the command.

10. The information handling device of claim 9, comprising instructions to request input from the user to clarify the low confidence portion and to update, responsive to receipt of the input, the performance of the action of the command based upon the high confidence portion and the clarified low confidence portion.

11. The information handling device of claim 9, comprising instructions to identify alternative actions corresponding to the low confidence portion and wherein the performance comprises performance of the alternative actions.

12. The information handling device of claim 11, wherein the performance of the alternative actions is responsive to a determination that the performance of the alternative actions is quicker than issuance of a request and receipt of input from a user regarding the low confidence portion.

13. The information handling device of claim 9, comprising instructions to identify, using historical information of the user, a possible input for the low confidence portion, and wherein the performance is based upon the possible input.

14. The information handling device of claim 9, wherein the high confidence portion corresponds to a common part of an action across a plurality of actions related to the command.

15. The information handling device of claim 9, wherein the low confidence portion comprises at least one of: a portion of the command that was not understood by the digital assistant and a missing portion of the command needed for complete performance of an action of the command by the digital assistant.

16. A non-transitory computer program product, the product comprising:

a computer-readable storage device that stores executable code that, when executed by a processor, causes the product to:

receive, at a digital assistant on an information handling device, a command from a user, wherein the command comprises a high confidence portion and a low confidence portion;

determine, at the digital assistant and utilizing a machine-learning model, that at least a part of an output corresponding to the command can be performed by the digital assistant based upon the high confidence portion, wherein to determine comprises identification of an electronic efficiency of starting an action present within the at least a part of the output corresponding to the command is designated between one of: an efficiency mode of operation and a strict command mode of operation, wherein the identification of the electronic efficiency of starting the action is designated based upon an attribute of at least one of: the user and the device, wherein identification of the attribute comprises utilizing historical data identifying correlations between the high confidence portion of the command and an end action corresponding to the command; and perform, using the digital assistant and responsive to determining the at least a part of the output of the command can be performed by the digital assistant, the at least a part of the output of the command associated with the high confidence portion, wherein the performance comprises performance of the action based upon the electronic efficiency of the starting of the action of the command and the historical data used to identify the correlations between the high confidence portion of the command the end action corresponding to the command.

\* \* \* \* \*